Oct. 10, 1939.　　LE GRAND S. WHEDON　　2,175,452
SEAT ADJUSTING UNIT
Filed May 1, 1937　　2 Sheets-Sheet 1

INVENTOR
LeGrand S. Whedon,
BY
Beau, Brooks, Buckley & Beau.
ATTORNEYS

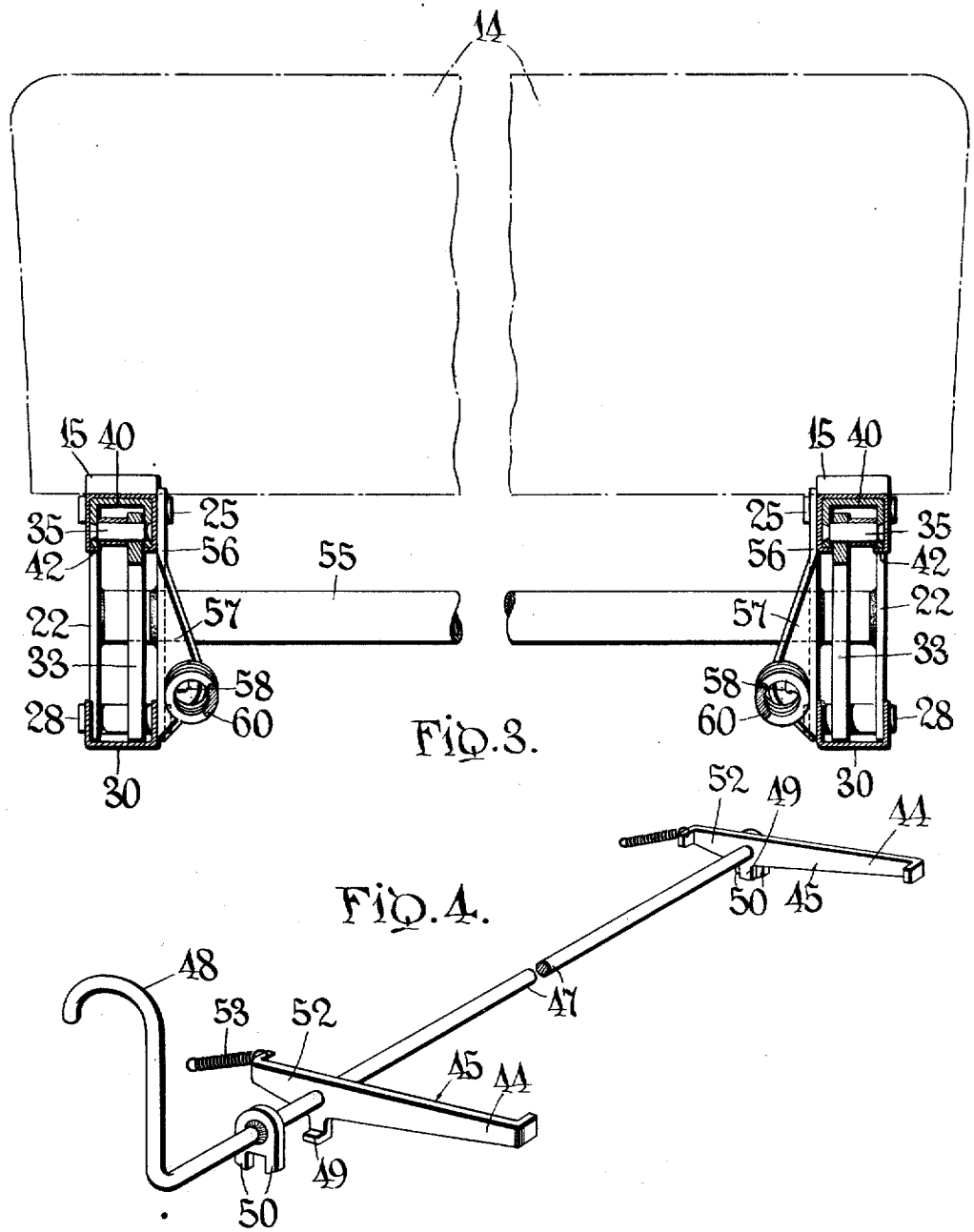

Patented Oct. 10, 1939

2,175,452

UNITED STATES PATENT OFFICE 2,175,452

SEAT ADJUSTING UNIT

Le Grand S. Whedon, Medina, N. Y.

Application May 1, 1937, Serial No. 140,214

4 Claims. (Cl. 155—14)

This invention relates to seat supporting structures and it has particular relation to an adjusting structure adapted to be installed between the floor and seat of an automotive vehicle.

One object of the invention is to provide an improved seat adjusting structure composed of inseparable parts, or parts adapted to be installed as a unit, for raising or lowering an automobile seat, and at the same time moving the seat forwardly or rearwardly.

Another object of the invention is to provide an improved adjusting structure adapted to be installed as a unit beneath a seat of an automotive vehicle and having supporting members so proportioned and arranged that the upper portion of the seat back is movable forwardly or rearwardly a proportionally greater distance than the lower portion of the seat back in response to adjusting manipulations, and wherein the rear portion of the seat is movable upwardly or downwardly a proportionally greater distance than the front portion of the seat in response to such adjusting manipulations.

Another object of the invention is to provide an improved assembly of front and rear link arms adapted to support a seat structure in pivoting relation, and wherein resilient elements are provided for assisting in pivoting the link arms upwardly in such manner that a proportionally greater pull or tension of the resilient element is exerted at the beginning of the upwardly pivoting action and leverage on the link arms diminishes progressively as the link arms are raised.

In one form of the invention a structural unit is provided which consists of a pair of members, such as channel members, disposed adjacent each side of an automobile seat, preferably underneath the latter, and these members extend in a direction lengthwise of the automobile, that is, in directions forwardly and rearwardly of the seat structure. A pair of link arms pivotally connects the rear portions of the members adjacent opposite sides of the seat, and a similar pair of elements of shorter length pivotally connects the front portions of the longitudinally extending members on opposite sides of the seat. A suitable brace connects one of the pairs of link arms and for convenience such brace is provided for the rear pair of link arms and a latching device is included for holding the link arms in adjusted positions. These link arms are pivoted for action at their lower connections about substantially stationary pivots and are pivotal from lower or substantially horizontal positions to upright positions, although not necessarily to absolute vertical positions. One or both of the rear link arms is provided with an angular extension which is disposed substantially vertically when the link arms are in their rearwardly adjusted or substantially horizontal position, and when the link arms are in an upright position the extension is moved toward a horizontal position. A spring which is normally under tension is connected to the outer end of the extension and to a forward portion of the unit. Thus, at the beginning of the upward pivotal movement of the link arms, the maximum leverage on the link arms is available for upwardly pivoting the link arms, and as the latter move upwardly this leverage diminishes, as well as the tension of the spring. Therefore, the greatest spring force is expended at the beginning of the raising movement when the greater lifting force is required, and at the position of the link arms in approaching their upright relation very little force is required to impart pivotal action to the link arms.

In arranging this structure, it has been found that the rear link arms should be disposed closely adjacent the rear edge portion of the seat in order that the combined raising and forward movement of the rear portion of the seat is transmitted directly from the rear link arms when the latter are pivoted from their lower position to their upright position. The front link arms are disposed preferably at positions at least one-third of the distance from the front edge of the seat bottom to the rear edge thereof and, therefore, a very material portion of the seat bottom extends forwardly beyond the front link arms and overhangs the front of the mechanism of the adjusting unit. Since the rear link arms are longer than those at the front, the latter provide a fulcruming action by which the front edge of the seat bottom is movable upwardly or downwardly less than half the upward or downward movement imparted to the rear edge of such seat bottom. This action occurs without appreciably diminishing the forward or rearward movement of the front edge of the seat bottom according to forward or rearward movement of the rear edge thereof.

In this arrangement, a taller vehicle operator can be seated comfortably when the link arms are in a lowered or substantially horizontal position. In order to accommodate shorter vehicle operators the link arms are adjusted toward their upright positions. Since the legs of the shorter person require less space and should be moved toward the pedal controls of the vehicle, the front link arms are made shorter in order that the spinal column and head of the operator can be moved upwardly a proportionally greater distance than the legs of the operator at the front edge of the seat. If the front edge of the seat were moved upwardly and forwardly from the rearward position in the same degree as the rear of the seat, then the legs of the shorter operator would be raised too great a distance for convenient manipulation of the controls, although his head may have been raised to proper position for substantially maximum vision. Hence, the fact that the front edge of the seat is movable upwardly only a slight distance while it is movable forwardly sufficiently to accommodate shorter vehicle drivers, is of great importance, especially when considered in connection with the fact that the rear portion of the seat bottom is moved upwardly more than twice the distance the front edge is moved, and further, when considered with the fact that the upper portion of the seat back is movable forwardly more than twice the distance resulting from the movement imparted to its lower portion during the compound forward and upward movement imparted to the seat by pivotal action of the link arms.

In the drawings:

Fig. 3 is a cross section taken substantially along the line III—III of Fig. 1, and Fig. 4 is a perspective of a latch and its operating mechanism.

Figure 1:
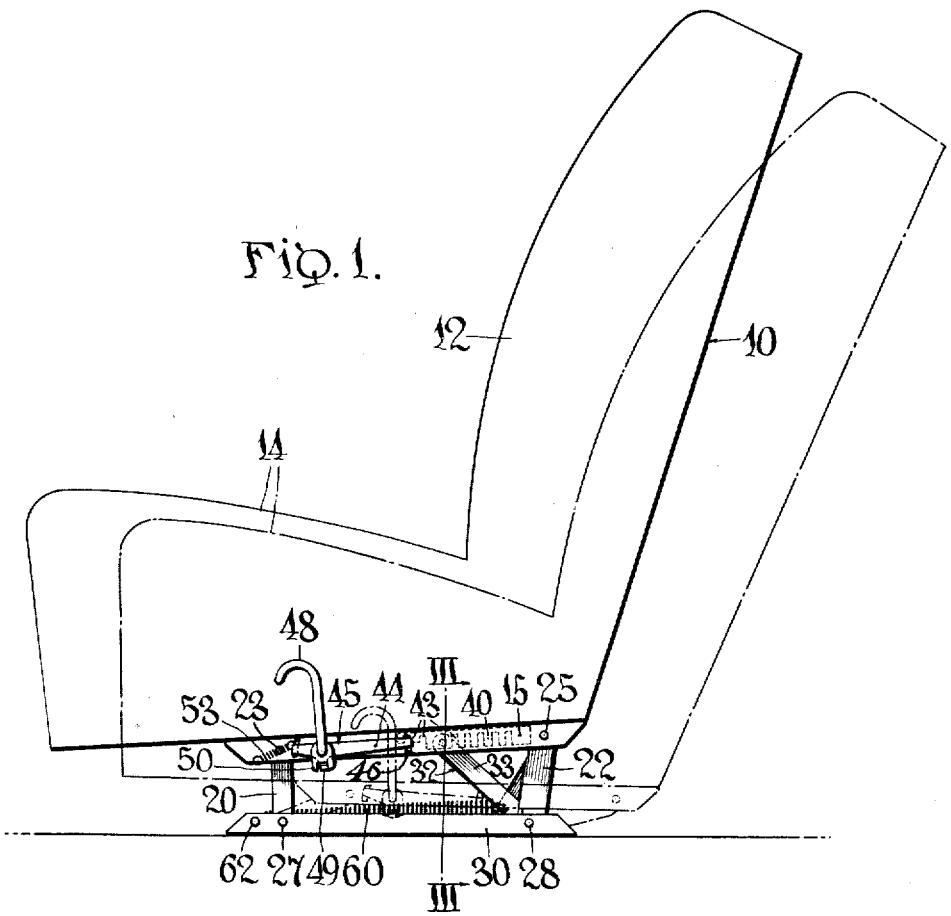
Fig. 1 is a side elevation of a seat installation in which the invention has been installed.

In practicing the invention a seat 10, including a seat back 12 and seat bottom 14, is provided with upper parallel channel members 15 rigidly secured to the seat bottom and disposed in such manner that they extend from the rear portion of such seat bottom toward the front portion thereof. Front and rear seat lifting link arms 20 and 22 of channel form are provided with pivotal connections 23 and 25 securing the upper link ends to the front and rear portions of the upper channel members 15. The lower ends of the front and rear link arms 20 and 22 are provided with pivotal connections 27 and 28 securing them in front and rear portions of lower channel members 30. An upper channel member 15 and a lower channel member 30 open toward each other adjacent each side of the seat bottom.

It will be noted that the front link arms 20 are shorter than the rear link arms 22, and that these arms are pivotally movable from a rearward position about the connections 27 and 28 to a substantially upright position. Each front link arm 20 in its forward or upright position has been moved forwardly slightly beyond its vertical position, while the rear link arms 22 in their movement to their upright position do not reach their vertical position during such movement.

An adjusting and latching mechanism 32 similar to that shown and described in my co-pending applications Ser. Nos. 13,358, filed March 27, 1935, and 117,207, filed December 22, 1936, includes a link 33 supported at its lower end adjacent each side of the seat upon the pivotal connection 28, the upper end of which link has a pivotal connection 35 securing it in an adjusting slide 40, which is channel shaped and is slidably mounted in the upper channel member 15. Suitable inwardly turned flanges 42 formed on the lower sides of the upper channel members 15 prevent accidental displacement of the adjusting slide from its path of movement in the channel member. Notches 43 formed in each adjusting slide are selectively engageable in locking relation by an arm 44 of a latch 45 which extends loosely through a slot 46 formed in one side of the upper channel member 15. This latch 45 is pivotally mounted upon a rod 47 extending rotatably and transversely through the upper channel members 15. An actuating handle 48 formed rigidly upon one end of the rod 47 extends adjacent one side of the seat where it is conveniently accessible for manual operation. A finger 49 formed rigidly upon the latch 45 extends loosely between two spaced projections 50 formed rigidly upon the rod 47, and the finger and projections are arranged in such manner as to provide limited rotative play of the rod with reference to the latch. An extension 52 disposed opposite the arm 44 and rigid with the latch is provided with a tension spring 53 having one end connected thereto. The other spring end is connected to the upper channel member. This spring is normally under tension and constantly exerts force upon the latch tending to pivot the arm 45 into the bottom of one of the notches 43 to prevent its accidental displacement therefrom.

In order to insure proper sturdiness in the link arm arrangement a transverse brace 55 is rigidly connected at its ends to the rear link arms 22. An inner flange 56 of each channeled link arm 22 is bent outwardly and is provided with a lateral and inclined extension 57 disposed outside the channel member 30 at the inner side of the latter (Fig. 3). Each extension 57 is provided with an opening 58 and the effective length of this extension is determined by the distance from the opening 58 to the axis of the connection 28. One end of a tension spring 60 is connected in the opening 58 and the other end of such spring is connected to a member 62 formed upon the front end portion of each lower channel member.

Figure 2:
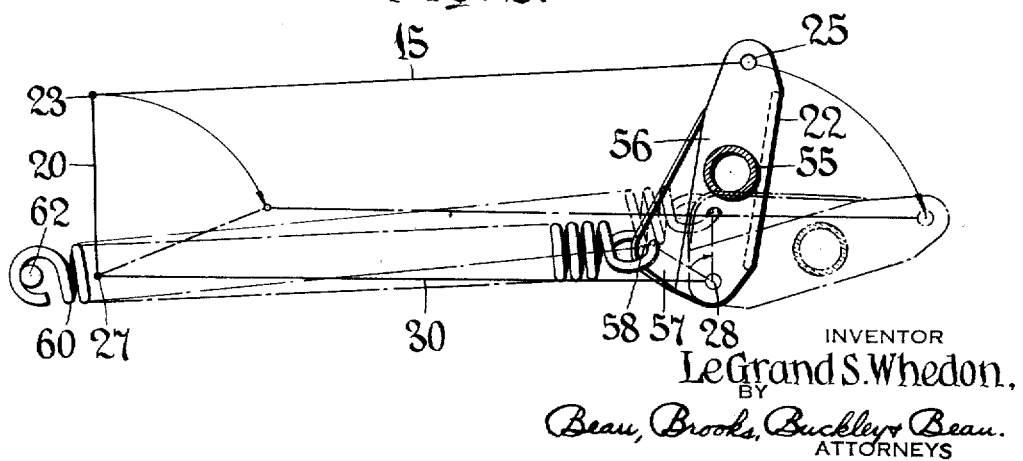
Fig. 2 is a diagrammatic side view of link arms and spring arrangement for the sea installation.

As best shown in Fig. 2, the link arms 20 and 22 are movable for purposes of adjustment about the lower pivotal connections 27 and 28 and through angles indicated between the broken and full line positions of these arms. It will be observed that in the broken line position of each rear link arm 22, that is, in a position approaching the horizontal, the extension 57, measured between the opening 58 and axis of the pivotal connection 28, is substantially vertical. In such position, the tension spring 60 exerts its maximum force. As each link arm approaches an upright position (Fig. 2) the extension (or line joining the opening 58 and axis of the pivotal connection 28) approaches a horizontal position, and hence, in addition to the diminution of the tensional force exerted by the spring, the leverage about the axis of the connection 28 also diminishes. Therefore, when the link arm 22 is in its rearwardly tilted position and the latch arm 44 is released from the adjusting slide 40, a maximum force is initially exerted by the spring 60 to raise the seat to the full line position shown in Fig. 1, and as the seat is being raised the spring force diminishes in proportion to the amount of force required to pivot the link arms 20 and 22 in a counter clockwise direction (Fig. 2) which required force diminishes as the link arms move toward their upright position.

Since the links on opposite sides of the seat can not operate in absolute precision, it is possible that the latch arm 44 may be entering a notch 43 on one side of the seat while the opposite arm 44 may not be registering exactly with a corresponding notch 43 on the other side of the seat. The slight play permitted between the finger 49 and projections 50 of the rod and latch, respectively, compensate for slight differences of this nature and insure proper locking of the parts, even though locking connection on one side of the structure may be slightly delayed.

In its lower or broken line position (Figs. 1 and 2), each upper channel member 15 rests substantially upon the adjacent lower channel member 30 in lengthwise relation, and the link 33 and arms 20, 22 adjacent each side of the seat are substantially inclosed in the channel members opening in opposed relation. The link arms and channel members can thus be collapsed to such extent as to occupy space of only two inch depth. In raising the seat structure by pivotal action of the link arms 20, 22 from a broken line position to a full line position (Fig. 1), it will be noted that the rear portion of the seat bottom 14 is raised at a greater rate and a greater distance than the front of the seat bottom. This inversely proportional movement of the front and rear portions of the seat bottom is accomplished by reason of the fact that each rear pivotal connection 25 is disposed directly below the seat back 12 and is spaced only a short distance from the rear extremity of the seat bottom; whereas, each front arm 20 is spaced considerably from the front edge of the seat bottom. This arrangement accentuates the tilting action of the upper portion of the seat back, as well as lessening the proportional upward component of movement of the front edge of the seat bottom as the link arms move between their broken line and full line positions.

In moving the seat upwardly between such broken and full line positions, the upper portion of the seat back moves forwardly more than twice the amount of forward movement of the seat bottom. Also, the rear portion of the seat bottom moves upwardly more than twice the amount of upward movement of the front edge of the seat bottom. Therefore, this arrangement of seat installation can be adjusted for a shorter person in such manner that the feet of such person are moved toward control pedals of an automobile while the person's spine adjacent the rear of the seat bottom is moved upwardly a proper distance and the head is moved forwardly to enhance the automobile driving position.

Although only one form of the invention is shown and described in detail, it will be apparent to those skilled in the art that the invention is not so limited, but that various changes can be made therein without departing from the spirit of the invention or from the scope of the appended claims.

I claim:

1. In a seat structure including a seat back and seat bottom, a pair of front link arms having their upper ends pivotally connected to the seat bottom to support the front portion thereof and being movable from a substantially horizontal position to a substantially upright position, a pair of rear link arms having their upper ends connected to the rear portion of the seat bottom and being movable from a substantially horizontal position to a substantially upright position, supporting means for pivotally supporting the lower ends of all of said link arms at locations spaced from the seat bottom, means connected to one of said pairs of link arms for maintaining the latter in substantially parallel relation, one of said link arms being of channel form with one of the channel sides provided with a laterally flaring extension and projecting at an angle to the latter arm from the lower pivotal connection thereof and being disposed in a substantially upright position when the link arm is disposed in a substantially horizontal position, a spring connected to the outer end of the extension and to said supporting means whereby maximum leverage between the spring and the link arm exists when the latter is in a substantially horizontal position and such leverage diminishes progressively as the link arm approaches an upright position.

2. In a seat structure including a seat back and seat bottom, a pair of front link arms having their upper ends pivotally connected to the seat bottom at locations materially spaced from the front edge of the seat bottom, and being movable from a substantially horizontal position to a substantially upright position, a pair of rear link arms having their upper ends pivotally connected adjacent the rear edge portion of the seat bottom and being movable from a substantially horizontal position to a substantially upright position, means rigidly connecting one pair of link arms for maintaining them in alignment, supporting means pivotally connected to the lower ends of all of said link arms at locations spaced from said seat bottom, said rear link arms being longer than said front link arms, whereby pivotal movement of the link arms from their substantially horizontal position to their substantially upright position imparts a progressively greater degree of upward movement to the rear edge of the seat bottom than to the front edge thereof while imparting substantially equal degrees of forward movement to the front and rear edges of said seat bottom.

3. In a seat structure including a seat back and seat bottom, a downwardly opening channel member secured to the seat bottom adjacent each side thereof and being disposed in directions forwardly and rearwardly thereof, a front link arm having its upper end pivotally connected in the front end portion of each channel member and at a location approximately one-third the distance from the front edge to the rear edge of the seat bottom and being movable from a substantially horizontal position to a substantially upright position, a rear link arm having its upper end pivotally connected in each channel member at a location beneath the rear wall of the seat back and being also movable from a substantially horizontal position to a substantially upright position, means for giridly connecting the rear links to maintain them in alignment, an upwardly opening channel member disposed in opposed and substantially parallel relation directly beneath each downwardly opening channel member, means for supporting each upwardly opening channel member, means for pivotally connecting the lower ends of the respective front and rear link arms in the front and rear end portions of the upwardly opening channel members, said rear link arms being longer than said front link arms, whereby movement of the link arms from their substantially horizontal position to their substantially upright position imparts a progressively greater degree of upward movement to the rear edge of the seat bottom than to the front edge thereof while importing substantially equal degrees of forward movement to the front and rear edges of said seat bottom.

4. In a seat structure including a seat back and a seat bottom for installation in a body of an automotive vehicle, rear link structure adapted to be pivoted rearwardly from an upright position, means for pivotally connecting the upper portion of the link structure to the seat bottom beneath the seat back, means for pivotally connecting the lower portion of the link structure to the floor of the vehicle body, the pivotal connections of said link structure being disposed substantially in alignment with the seat back in the upright position of said link structure, second link structure shorter than the first mentioned link structure disposed a substantially greater distance rearwardly from the front edge of the seat bottom than the distance from the rear edge of the seat bottom to the first mentioned link structure, a device for adjusting the link structure between the upright and rearwardly pivoted positions thereof, and means for connecting said device to the link structure and seat bottom.

LE GRAND S. WHEDON.

CERTIFICATE OF CORRECTION.

Patent No. 2,175,452.  October 10, 1939.

LE GRAND S. WHEDON.

It is hereby certified that error appears in the printed specification of the above numbered patent requiring correction as follows: Page 3, second column, line 57, claim 3, for "giridly" read rigidly; line 73, same claim, for the word "importing" read imparting; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.

4. In a seat structure including a seat back and a seat bottom for installation in a body of an automotive vehicle, rear link structure adapted to be pivoted rearwardly from an upright position, means for pivotally connecting the upper portion of the link structure to the seat bottom beneath the seat back, means for pivotally connecting the lower portion of the link structure to the floor of the vehicle body, the pivotal connections of said link structure being disposed substantially in alignment with the seat back in the upright position of said link structure, second link structure shorter than the first mentioned link structure disposed a substantially greater distance rearwardly from the front edge of the seat bottom than the distance from the rear edge of the seat bottom to the first mentioned link structure, a device for adjusting the link structure between the upright and rearwardly pivoted positions thereof, and means for connecting said device to the link structure and seat bottom.

LE GRAND S. WHEDON.

CERTIFICATE OF CORRECTION.

Patent No. 2,175,452.  October 10, 1939.

LE GRAND S. WHEDON.

It is hereby certified that error appears in the printed specification of the above numbered patent requiring correction as follows: Page 3, second column, line 57, claim 3, for "giridly" read rigidly; line 73, same claim, for the word "importing" read imparting; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.